March 3, 1970  C. L. ALDRIDGE  3,498,749
PRODUCTION OF METAL CARBONYLS AND CARBON BLACK
Filed Dec. 23, 1966
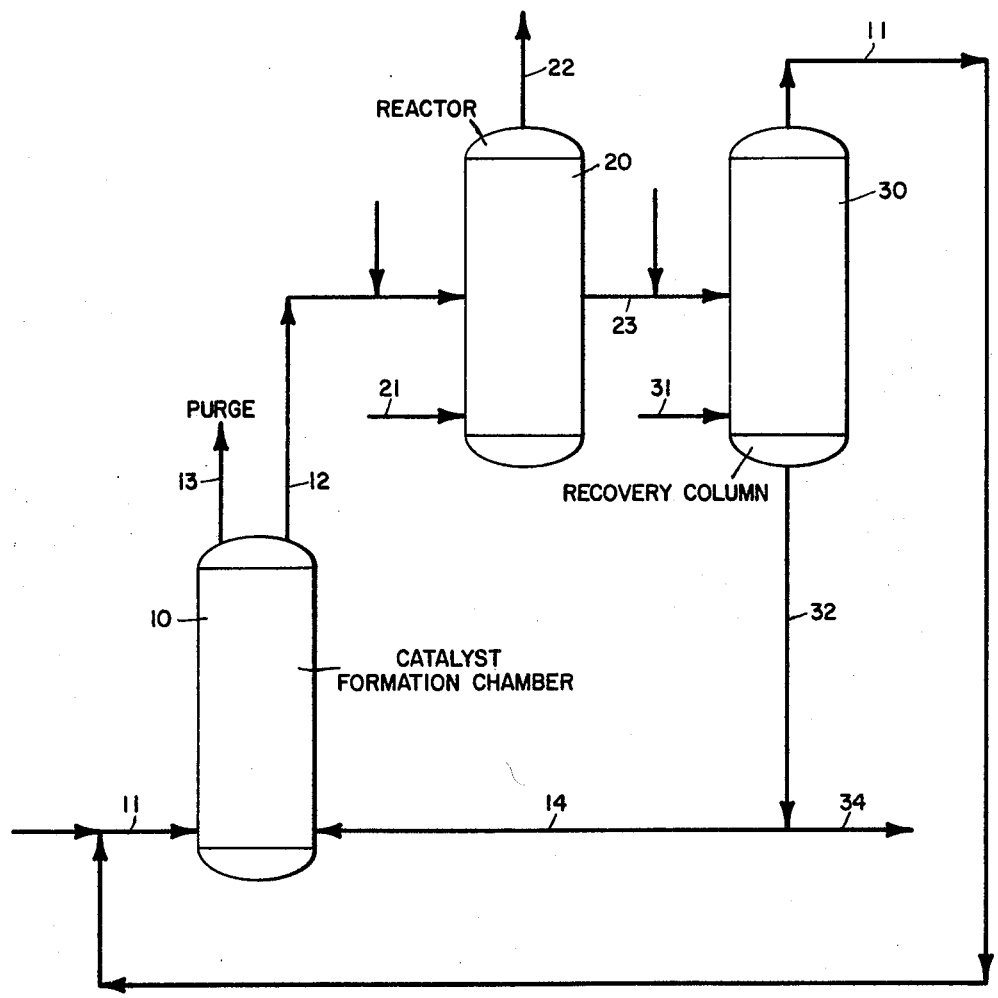
C. L. ALDRIDGE   INVENTOR
BY
PATENT ATTORNEY United States Patent Office 3,498,749
Patented Mar. 3, 1970

3,498,749
PRODUCTION OF METAL CARBONYLS AND
CARBON BLACK
Clyde L. Aldridge, Baton Rouge, La., assignor to Esso
Research and Engineering Company, a corporation of
Delaware
Filed Dec. 23, 1966, Ser. No. 604,243
Int. Cl. C09c 1/48; C01g 53/02; B01j 11/22
U.S. Cl. 23—203 10 Claims

ABSTRACT OF THE DISCLOSURE

An improved process for the recovery of metal by contact and treatment of metal contaminated carbonaceous materials with carbon monoxide to which is added a sufficient concentration of hydrogen to catalyze and facilitate the formation of volatile metal carbonyl compounds which can be conveniently separated as a gas from the carbonaceous materials to leave the latter in a state of high purity and suitable for use as carbon black.

---

It is known to thermally or catalytically decompose or dissociate carbonaceous materials, e.g., hydrocarbons and carbon monoxide, to form elemental carbon. In dissociation of the former, hydrogen is concurrently produced. Both types of process offer many disadvantages. The thermal process, for example, generally offers the disadvantage of requiring large quantities of heat and exceptionally high temperatures. This, of course, is quite expensive and may even require combustion of a part of the feed with resultant high cost and low yields based on feed.

In catalytic processes, hydrocarbons can be contacted and reacted with various metals and oxides, primarily Group VI-B, Group VII-B and Group VIII metals of the Periodic Chart of the Elements to yield carbon and hydrogen. Generally, less heat is required than in thermal processes; but, unfortunately, these processes are also deficient in many respects. A major deficiency relates to the loss of the carbonaceous material which cannot be recovered as carbon black, even though recovery of hydrogen may be possible. Moreover, catalyst consumption is extraordinarily high in these processes. For these reasons, inter alia, such processes are not believed of commercial significance.

In application S.N. 585,496, filed Oct. 10, 1966, abandoned there is described an improved process combination for the formation and recovery of carbon black. In accordance therewith, carbon is formed via catalytic means and then recovered in a state of high purity as carbon black, in steps which include:

(a) Forming a catalyst by contacting particulate recycle carbon black, i.e., carbon black produced within the process itself, with a heat decomposable carbonyl compound, or compounds, of a catalytic metal to thermally decompose the latter and provide metal at the surfaces of the carbon black, (b) Contacting the so-formed catalyst with a carbonaceous material to thermally decompose the latter to carbon, (c) Withdrawing the product and spent catalyst mixture and reacting same with carbon monoxide gas to regenerate the initially used heat-decomposable carbonyl compound of the catalyst metal, and thence (d) Re-employing the said heat-decomposable compound in step (a), supra, to reform fresh catalyst for use in step (b).

In the initial step of the process (a), the catalyst is formed by decomposition of catalytically active metal upon a carbon black support, the carbon black being a portion of the product generated in the process. This provides a suitably active catalyst, and use of the carbon black product as support reduces eventual contamination of the product as occurs, particularly where the support is wholly or partially consumed in the basic carbon forming reaction. It also lessens the total cost of the catalyst, and provides a convenient method for recovery of the catalytic metal.

In a preferred method of forming the catalyst, from 1 to about 75 percent, and more preferably from about 5 to about 50 percent metal, based on the total weight of catalyst, is deposited on the carbon black.

In the preferred practice of the invention, carbonyl compounds of the catalytically active metals are employed. The preferred metal carbonyl compounds are those formed from Groups VI-B, VII-B and VIII of the Periodic Chart of the Elements. The process is thus preferably conducted by contacting together a particulate portion of the product carbon black and a carbonyl compound of the active metal at sufficient temperature to decompose and volatilize the metal carbonyl compound to carbon monoxide and metallic metal. A metal carbonyl compound is generally mixed with or dissolved in carbon monoxide carrier gas and fed into a decomposition zone and reacted by contact with the carbon black at decomposition temperatures ranging from about 300° F. to about 500° F. The precise temperature is, however, dependent to a large extent upon the specific metal carbonyl to be decomposed. Generally, the reactions are conducted at substantially atmospheric pressure, though relatively mild subatmospheric or supra-atmospheric pressures can be employed, if desired, to achieve other process benefits. The more preferred metal carbonyls for use in the decomposition reaction are those formed from iron, cobalt and nickel because of the high activity of these metals, and the ease of handling. The reaction can be conducted in a fluidized bed, a moving bed, or in a constantly agitated or stirred pot reactor.

The second step (b) of the process sequence involves the decomposition of a carbonaceous compound to produce elemental carbon. In accordance with a preferred embodiment a hydrocarbon feed, which may include mixtures of hydrocarbons, is contacted with the catalyst and reacted or decomposed into essentially carbon and hydrogen. The more preferred feeds are the normally gaseous hydrocarbons, e.g., saturated aliphatic hydrocarbons, such as methane, ethane, propane, butane and the like, and unsaturated aliphatic hydrocarbons such as ethylene, acetylene, propylene, and the like. Suitable feeds also include various fuel gases and natural hydrocarbon mixtures of such compounds, e.g., natural gas and the like. Low boiling naphthas and various other petroleum fractions are also useful. Aromatic hydrocarbons, whether substituted or unsubstituted, such as benzene, toluene, xylene, cumene and the like, can also be employed.

The carbon-forming reaction is suitably conducted at temperatures ranging from about 500° F. to about 1500° F., and preferably from about 800° F. to about 1200° F. The reactions are generally conducted at substantially atmospheric pressure to obtain optimum yield, though supra-atmospheric pressures can be employed in certain instances. The precise temperature and pressure employed, however, are largely dependent upon the specific hydrocarbon, or hydrocarbons, to be reacted and to some extent upon the nature of the catalyst with which the hydrocarbon is contacted.

In a preferred embodiment methane, or methane-containing gases, is employed at temperatures ranging from about 1300° F. to about 1500° F. In accordance therewith, maximum yields of high purity hydrogen are obtained. Preferably, the reaction is conducted at substantially atmospheric pressure.

Sufficient residence time is provided for the catalyst to remain in the carbon-forming reaction zone to obtain optimum yields, this generally ranging from about one-fourth hour to about 20 hours, and preferably from about 1 to about 8 hours. The gas is fed at a rate sufficient to provide a contact time ranging from about 0.001 to about 500 seconds, and preferably from about 0.01 to about 50 seconds. The activity of the catalyst in the reaction zone is diminished as the reaction proceeds. After a certain stage of use, the activity of the catalyst can, in fact, diminish quite sharply and hence in a continuous process the catalyst is generally withdrawn from the reaction zone prior to this occurrence, and charged into a catalyst recovery zone.

In the third step (c) of the process sequence, the spent catalyst and carbon black product mixture is reacted with carbon monoxide to form metal carbonyls, to volatilize, and sweep from the reaction zone the metal carbonyls formed in the reaction. The metal carbonyls formed are similar to those used in the initial zone (a) of the process.

The present invention is based upon the discovery that the removal and recovery of the metallic catalyst from the carbon can be greatly accelerated and improved by use of gaseous mixtures consisting essentially of carbon monoxide to which has been added from about 1 percent to about 30 percent hydrogen, based on the total volume of the resulting mixture. Preferably, sufficient hydrogen is added to form a blend of from about 2 percent to about 20 percent and, most preferably from about 5 percent to about 10 percent, hydrogen in the total gaseous mixture.

The reason for the effectiveness of hydrogen in these gaseous mixtures for removing metals from metal contaminated carbonaceous mixtures, particularly from the complicated spent catalyst and carbonaceous product mixtures is not fully understood.

The metal catalyst of the carbonaceous product mixtures is consumed and thoroughly dispersed throughout the mixture so that contact between the metal portions of the mixture and gas, except at exposed surfaces, is prevented. In contacting and reacting carbon monoxide gas per se with the product mixture, the rate of reaction to form metal carbonyl compounds is relatively slow and treatment to remove the bulk of the metal requires considerable time and large quantities of treat gas. Further, if a gaseous mixture of carbon monoxide with high hydrogen concentration, e.g., water gas, is used the rate of reaction is improved very little, if any. Quite surprisingly, however, if a gaseous mixture containing relatively small and critical concentrations of hydrogen is used, the rate of reaction is greatly accelerated and can be conducted with relative ease.

The activity of the carbon monoxide gas in reacting with the metal is thus enhanced when using the relatively small and critical concentrations of hydrogen gas within the gaseous mixture. The hydrogen initially reacts with carbon thereby exposing the formerly shielded metal portions of the carbonaecous mass to the action of the carbon monoxide.

The spent catalyst is reacted with the hydrogen-carbon monoxide gaseous mixture at temperatures ranging from about 100° F. to about 500° F., and preferably at temperatures ranging from about 200° F. to about 400° F. The hydrogen-carbon monoxide treatment is conducted at elevated pressures ranging generally from about 50 to about 3000 pounds per square inch and preferably from about 500 to 2000 pounds per square inch. The quantity of hydrogen and carbon monoxide fed into the recovery zone is related in large extent to the specific metal carbonyl compound which is to be formed. Thus, of course, larger amounts of carbon monoxide are required to produce tetravalent metal compounds than di- or tri-valent metal compounds, but the additional amounts of gas required are relatively insignificant as compared with the total volume of gases employed in the reaction.

The invention will be better understood by the following demonstrations and examples which bring out the salient features of the present invention.

The demonstrations immediately following compare the relative case of converting nickel to nickel carbonyl when the metal is deposited on an ordinary or conventional support, as contrasted with treatment of a nickel contaminated carbonaceous product. In the demonstrations, high purity carbon monoxide gas is used as the treating agent. Hence, the comparison is a measure of the relative difficulty of removing catalytic metal from the carbonaceous product mixture to form carbon black as contrasted with removal of metal from a conventional catalyst support.

In a first run, 40 parts by weight of a catalyst containing 50 weight percent nickel deposited on Kieselguhr is used; and, in a second run, 14.1 parts by weight of a carbonaceous product mixture containing 1.31 weight percent nickel is used. The materials are placed in a vessel, these amounts of the respective materials having been selected because they occupy the same approximate volume. Each of the respective materials are maintained at 75° C., and through each is passed roughly 35 parts by weight of carbon monoxide gas. The runs are conducted at atmospheric pressure. These data and the results obtained are tabulated in the following Table I.

TABLE I

| Run No. | Weight of solid | Percent nickel in solid | Percent of available nickel removed by gas |
|---|---|---|---|
| 1 | 40 | 50 | 20 |
| 2 | 14.1 | 1.31 | 0.0156 |

From the foregoing table, it is thus shown that twenty percent of the metal originally present on the catalyst support is removed in Run 1 whereas, in sharp contrast, less than two-hundredths of one percent is removed from the carbonaceous product mixture in Run 2. This is so even though in Run 1 the initially applied driving force for removing the metal is diminished by the fast rate of reactions and absorption of the metal carbonyl into the gas, whereas in Run 2 the original driving force remains virtually unaffected. Hence, these data llustrate the far greater difficulties involved in removing metal from carbonaceous product mixtures which holds metals tenaciously, as opposed to the removal of metal from ordinary catalyst supports.

The following Table II is a further tabulation of data showing the effect of hydrogen in the gaseous mixture for removing metal from metal-containing carbonaceous product mixtures.

A carbonaceous product mixture, prepared by the method described heretofore, containing 0.73 percent by weight nickel is charged into a lined tubular column operated and maintained at 140° C. and at a carbon monoxide partial pressure of approximately 460 pounds per square inch. Initially, for comparative purposes, substantially pure carbon monoxide gas is used (Run 1) and then mixtures of gas containing both hydrogen and carbon monoxide are passed through the column (Runs 2 and 3). Individual portions of the gaseous effluents from the several runs are separately analyzed to determine the nickel tetracarbonyl content per unit volume of gas calculated on the basis of ninety percent nickel removal.

TABLE II

| Run No. | Mole percent hydrogen content in total gas | Nickel concentration per unit volume in effluent gas at 90% recovery |
|---|---|---|
| 1 | 0 | 3.2 |
| 2 | 7.0 | 18.0 |
| 3 | 22.0 | 5.0 |

From these comparative data it is thus apparent that certain critical concentrations of hydrogen can be employed to speed up the rate of nickel removal. Thus, the rate of recovery is more than five times greater where seven percent hydrogen is employed as compared with use of a pure stream of carbon monoxide. On the other hand, where relatively large concentrations of hydrogen are employed, the rate of recovery decreases. Thus, where twenty-two percent hydrogen is employed, the rate of recovery is reduced quite rapidly. Of course, when essentially pure hydrogen is used, no nickel is removed from the carbonaceous product mixture.

The process will be better understood by specific reference to the attached flow sheet, and to the following detailed description thereof.

Referring to the flow sheet is shown a schematic diagram representing a catalyst formation chamber 10, a reactor 20, and a catalyst recovery vessel 30. Catalyst is prepared or formed in the chamber 10 for use in reactor 20. The spent or inactive catalyst from reactor 20 is passed to the recovery vessel 30 for reclaiming of the constituent parts thereof. Reclaimed catalytic metals from the recovery vessel 30 are reused to form catalyst in the catalyst chamber 10, and a portion of the carbon black product is also recycled thereto for use as a catalyst support.

Suitable catalyst is prepared in the catalyst formation chamber 10 by deposition of a catalytic metal on the carbon black. A carbonyl compound of a catalytic metal, e.g., iron cobalt or nickel, is contacted with the particulate carbon product at temperatures sufficient to thermally decompose the metal carbonyl compound to carbon monoxide and metallic metal. Under these conditions the gas is evolved from chamber 10 via line 13 while at least some of the metal is deposited sufficiently near the surfaces of the particulate carbon black product to form a suitable supported catalyst.

In a typical reaction, therefore, a nickel carbonyl compound, e.g., nickel tertracarbonyl, is introduced into the chamber 10 via line 11 while a portion of the product carbon black is reintroduced therein via recycle through line 14. Sufficient proportions of the nickel tetracarbonyl compound and carbon black are provided, at the conditions of reaction, to produce a catalytically active material. The active catalyst is transported to rector 20 via line 12, having enough active metal thereon to form a suitable catalyst.

A suitable hydrocarbon, or hydrocarbon mixture, is introduced into reactor 20 via line 21 and into contact with the active catalyst introduced into the reactor 20 via line 12. The hydrocarbon, e.g., methane, is decomposed, the reaction being conducted at a temperature sufficient to catalytically decompose the said hydrocarbon to essentially carbon black and hydrogen. The hydrogen, with some unreacted methane, is evolved from the reactor 20 and exits therefrom via overhead line 22 from whence it is passed to a recovery section, while the solid carbon black, with partially or wholly inactivated or spent carbon black supported catalyst, is passed via line 23 to the recovery or reclaiming vessel 30.

In the recovery vessel 30 the spent catalyst and carbon black product mixture are contacted with a gaseous mixture of hydrogen and carbon monoxide which enters the vessel 30 via line 31 to react with the metal and reform the metal carbonyl. The nickel tetracarbonyl, as a vapor, is passed via the loop formed by line 11 back to the chamber 10 for further use in the formation of a new catalyst. Carbon black, essentially free of metal, is removed from the bottom of the recovery column 30 via line 32. One portion of the carbon is removed via line 34 as product. The other portion is sent via line 14 to the decomposition chamber 10 to serve as a support for the manufacture of new catalyst.

Makeup gas can be added to line 11 to serve as carrier gas for the metal carbonyl. Makeup quantities of nickel tetracarbonyl can be added to decomposition chamber 10, or to line 11, if desired. On the other hand, finely divided metallic nickel can be added in makeup quantities to reclaiming vessel 30, as via injection into line 23, if desired. Or, if desired, nickel can be added directly to reactor 20, as via direct addition to line 12.

It is apparent that some changes, alterations, and modifications can be made without departing from the spirit and scope of the invention:

Having described the invention, what is claimed is:

1. In a process for forming metal carbonyl compounds by contact of metal containing carbonaceous product mixtures with gaseous carbon monoxide at reaction conditions, the improvement comprising adding sufficient hydrogen to the carbon monoxide to form a total gaseous mixture containing from about 2 volume percent to about 20 volume percent hydrogen.

2. In a process for the production and recovery of carbon black which includes the steps of: (a) forming a catalyst by contacting particulate carbon black, generated from within the process itself, with a heat-decomposable carbonyl compound of a catalytic metal, to thermally decompose the compound to liberate and deposit the metal on the carbon black which serves as a support for the metal; (b) contacting a carbonaceous compound with the so-formed catalyst to thermally decompose the compound to liberate carbon, the improvement comprising (c) withdrawing a mixture of the spent catalyst and carbon black product and contacting said mixture with carbon monoxide containing from about 2 volume percent to about 20 volume percent hydrogen, to reform the initially used heat decomposable carbonyl compound of the catalytic metal, and thence re-employing the said reformed heat decomposable carbonyl compound in (a) to reform fresh catalyst.

3. The process of claim 2 wherein the metallic portion of the carbonyl compound is selected from iron, cobalt and nickel.

4. The process of claim 2 wherein the carbonaceous compound with which the catalyst is contacted is a hydrocarbon.

5. The process of claim 4 wherein the hydrocarbon is a normally gaseous hydrocarbon.

6. The process of claim 2 wherein the mixture of spent catalyst and carbon black product contains nickel and, when reacted with the gaseous mixture of carbon monoxide and hydrogen, nickel tetracarbonyl is formed.

7. The process of claim 6 wherein the gas mixture is reacted at temperature ranging from about 100° F. to about 500° F., and at elevated pressures.

8. The process of claim 2 wherein (a) nickel tetracarbonyl is contacted with a portion of the carbon black product and thermally decomposed to form a nickel impregnated catalyst and a carbon black support; (b) the catalyst is contacted with methane at a temperature ranging from about 1300° F. to about 1500° F. to co-produce carbon and hydrogen, (c) the spent catalyst is withdrawn from the reaction zone and contacted in a separate zone, with a gas consisting essentially of carbon monoxide containing from about 2 volume percent to about 20 volume percent hydrogen gas to form nickel tetracarbonyl, (d) the nickel tetracarbonyl is volatilized and swept out of the reaction zone and is returned to the initial reaction zone and decomposed with carbon black to form new catalyst.

9. A process for the production and recovery of carbon black which comprises
   (a) forming a catalyst by contacting particulate carbon black with a carbonyl compound of a catalytic metal selected from the group consisting of Groups VI–B, VII–B and VIII of the Periodic Chart of the Elements, at a temperature in the range of from about 300° F. to about 500° F. to thermally decompose the carbonyl compound to liberate and deposit the catalytic metal on the carbon black which serves as a support for the metal;
   (b) contacting a carbonaceous compound with the catalyst formed in step (a) at a temperature in the range of from about 1300° F. to about 1500° F. to thermally decompose the carbonaceous compound to liberate carbon;
   (c) withdrawing a mixture of the spent catalyst and carbon black product and contacting the said mixture with a gaseous carbonylation mixture consisting essentially of carbon monoxide and hydrogen, wherein the amount of hydrogen is in the range of from about 2 volume percent to about 20 volume percent, to reform the carbonyl compound of the catalytic metal, and (d) re-employing the reformed carbonyl compound of the catalytic metal in step (a) to reform fresh catalyst.

10. The process of claim 9 wherein the metallic portion of the carbonyl compound is selected from iron, cobalt and nickel and wherein the carbonaceous compound is a hydrocarbon.

References Cited

UNITED STATES PATENTS

| 1,759,268 | 5/1930 | Mittasch | 23—203 |
| 1,783,744 | 12/1930 | Mittasch | 23—203 |
| 1,789,813 | 1/1931 | Gaus | 23—203 |

FOREIGN PATENTS 363,735   12/1931   Great Britain.

EDWARD J. MEROS, Primary Examiner

U.S. Cl. X.R.

23—209.5; 252—447